United States Patent [19]
Frew

[11] Patent Number: 5,704,392
[45] Date of Patent: Jan. 6, 1998

[54] APPARATUS FOR CYCLING MOTOR-OPERATED VALVES

[75] Inventor: James E. Frew, Lanoka Harbor, N.J.

[73] Assignee: Valve Management Services, Inc., Roswell, Ga.

[21] Appl. No.: 476,263

[22] Filed: Jun. 7, 1995

[51] Int. Cl.$^6$ .................... F16K 37/00; F16K 31/05
[52] U.S. Cl. ............ 137/554; 251/129.03; 251/129.12; 251/291
[58] Field of Search .................. 137/554; 251/58, 251/77, 79, 81, 129.12, 290, 291, 292, 129.03

[56] References Cited

U.S. PATENT DOCUMENTS

| | | | |
|---|---|---|---|
| 3,687,415 | 8/1972 | Turkot | 251/129.03 |
| 3,704,853 | 12/1972 | Waller | 251/59 |
| 3,768,775 | 10/1973 | Archer | 251/230 |
| 3,822,612 | 7/1974 | Sanctuary | 251/129.12 X |
| 4,092,877 | 6/1978 | Ledeen et al. | 74/625 |
| 4,120,596 | 10/1978 | Kunkle | 403/14 |
| 4,231,389 | 11/1980 | Still et al. | 251/291 X |
| 4,239,178 | 12/1980 | Engel et al. | 251/14 |
| 4,407,326 | 10/1983 | Wilhelm | 251/129.12 X |
| 4,460,009 | 7/1984 | Nanci et al. | 137/243 |
| 4,463,930 | 8/1984 | Vamuakas | 251/129.12 |
| 4,541,609 | 9/1985 | Smith | 251/129 |
| 4,621,789 | 11/1986 | Fukamachi | 251/129 |
| 4,687,179 | 8/1987 | Smith | 251/58 |
| 4,719,939 | 1/1988 | Killian | 137/315 |
| 4,757,684 | 7/1988 | Wright | 60/404 |
| 4,790,514 | 12/1988 | Marks | 251/129 |
| 5,052,430 | 10/1991 | Trautwein | 137/315 |
| 5,098,063 | 3/1992 | Ronzon | 137/554 |
| 5,099,867 | 3/1992 | Emery | 137/554 X |
| 5,101,862 | 4/1992 | Leete | 137/899 |
| 5,137,257 | 8/1992 | Tice | 251/129 |
| 5,156,373 | 10/1992 | Boyles et al. | 251/129 |
| 5,224,512 | 7/1993 | Nogami et al. | 137/554 |
| 5,232,198 | 8/1993 | Boyles et al. | 251/129.12 |
| 5,269,492 | 12/1993 | McLennan | 251/229 |
| 5,333,834 | 8/1994 | Soderberg | 251/86 |
| 5,340,078 | 8/1994 | Dean | 251/59 |
| 5,381,996 | 1/1995 | Arnemann | 251/59 |
| 5,449,143 | 9/1995 | Hur | 251/129.12 X |

Primary Examiner—John Rivell
Attorney, Agent, or Firm—Kinney & Lange, P.A.

[57] ABSTRACT

The present invention is an apparatus for cycling a valve having a valve operator for rotationally operating the valve. The apparatus includes a rotary actuator having an output shaft for developing a rotational force and a torque-sensing release clutch for transferring the rotational force to the valve operator. The torque-sensing release clutch decouples the rotational force from the valve operator upon sensing torque at least as great as a preset torque limit. In a preferred embodiment, an adaptive mounting assembly mounts the apparatus to the valve, providing three-dimensional adjustment of the clutch position relative to the valve operator. A counter counts turns of the valve operator to measure and indicate position of the valve, and a switch disables the rotary actuator when the clutch decouples the rotational force from the valve operator.

18 Claims, 3 Drawing Sheets

APPARATUS FOR CYCLING MOTOR-OPERATED VALVES

BACKGROUND OF THE INVENTION

The present invention relates to an apparatus for cycling valves. More precisely, it pertains to a portable valve cycling device having a torque-sensing release clutch for decoupling rotational forces of the device from a valve upon sensing a preset torque limit, or threshold.

Motor-operated valves (MOVs) include a valve for controlling fluid flow through a housing, a rotary valve operator operatively coupled to the valve, and primary and secondary rotary actuators to selectively operate the valve operator. The valve operator translates rotational movement of the rotary actuators to operate the valve between an open and a closed position. Operating either of the actuators operates the valve to control fluid flow. As used herein, MOV refers to any valve with a powered actuator.

The primary rotary actuator is typically an electric motor, but alternatively it may be a hydraulic or pneumatic motor. The secondary rotary actuator is usually a manually-operated actuator such as a handwheel coupled to the valve operator. It is common, especially in larger valves, for the primary and secondary actuators to include gears to achieve a mechanical advantage in operating the valve. A proper gear ratio reduces the force, and sometimes the size and weight of the actuator required to operate the valve. However, gears increase the extent of operation (i.e., number of turns) of the valve operator necessary to operate the valve from a fully open to a fully closed position. For example, some large valves require as many as 1,300 turns, or revolutions, of the valve operator to operate the valve between a fully open and a fully closed position. Fully cycling such valves, i.e. operating the valve from its fully open position to its fully closed position and back to its fully open position, requires several thousands of turns. Though not an appreciable concern when using a primary electric, pneumatic, or hydraulic motor, a large number of turns becomes onerous and time-consuming when manually operating the valve.

Manual operation of MOVs typically occurs during routine preventative maintenance and inspection. Such maintenance entails replacing valve packing and setting and testing limit switches. In replacing valve packing, which typically includes several stacked rings of packing fitted around a valve operator, it is necessary to install each ring separately and cycle the valve to work the ring down the operator onto the opening from which the operator extends. Individually cycling each packing ring consolidates the packing, thereby forming an effective seal between the valve operator and its opening in the valve housing. Cycling is also necessary to set and test limit switches and to monitor the valve for binding and overtorqing.

In environments having large numbers of MOVs, such preventative maintenance is quite costly and time-consuming. For example, manually cycling a large MOV like that described above may require as many as 18 man-hours, depending on the placement and accessibility of the handwheel. Thus, to reduce maintenance time and cost, it is desirable to cycle valves as quickly as possible without damaging them. In addition to the time and cost of manually cycling MOVs, there are health concerns. In particular, because many MOVs operate in radioactive and/or high heat environments, workers manually cycling these MOVs must endure radiation and high heat for extended periods. Exposure to these hazards is a significant concern when cycling MOVs within nuclear power plants. Thus, it is also desirable to reduce such exposure.

Although portable valve actuators are available, they are typically tailored for operating hard-to-turn valves, not cycling MOVs during routine maintenance. One such portable valve actuator is described in U.S. Pat. No. 3,768,775 to Archer. Archer provides a portable high-torque actuator particularly suited for turning the hard-to-turn underground valves of communal gas and water distribution systems. Archer's valve actuator mounts to the valve housing by a yoke assembly that engages opposite sides of the valve housing. Another portable actuator, described in U.S. Pat. No. 4,790,514 to Marks, includes a remote control radio transmitter for remotely operating the actuator. Marks also provides a cantilever support structure for attaching the actuator to a valve housing. U.S. Pat. No. 5,156,373 to Boyles et al. also describes a remotely controllable valve actuator tailored for attachment to petroleum industry valves. Boyles includes a counter for indicating valve position.

SUMMARY OF THE INVENTION

The present invention is an apparatus for cycling a valve having a valve operator that rotationally operates the valve. The apparatus includes a rotary actuator having an output shaft for developing a rotational force and a torque-sensing release clutch for coupling the rotary actuator to the valve operator. The torque-sensing release clutch mechanically decouples the rotational force from the valve operator upon sensing torque at least as great as a preset torque limit.

One feature of the invention is an adaptive mounting assembly that permits three-dimensional positioning of the cycling apparatus relative to the valve operator.

Another feature of the invention is a switch operated by the torque-sensing release clutch to disable the rotary actuator, upon sensing torque at least as great as the preset torque limit.

Another feature of the invention is a counter that counts revolutions of the valve operator to measure position of the valve.

Additionally, the invention provides a remote controller to selectively operate the rotary actuator in forward and reverse directions. The controller includes a count indicator to indicate position of the valve.

DETAILED DESCRIPTION OF THE PREFERRED EMBODIMENTS

Figure 1:
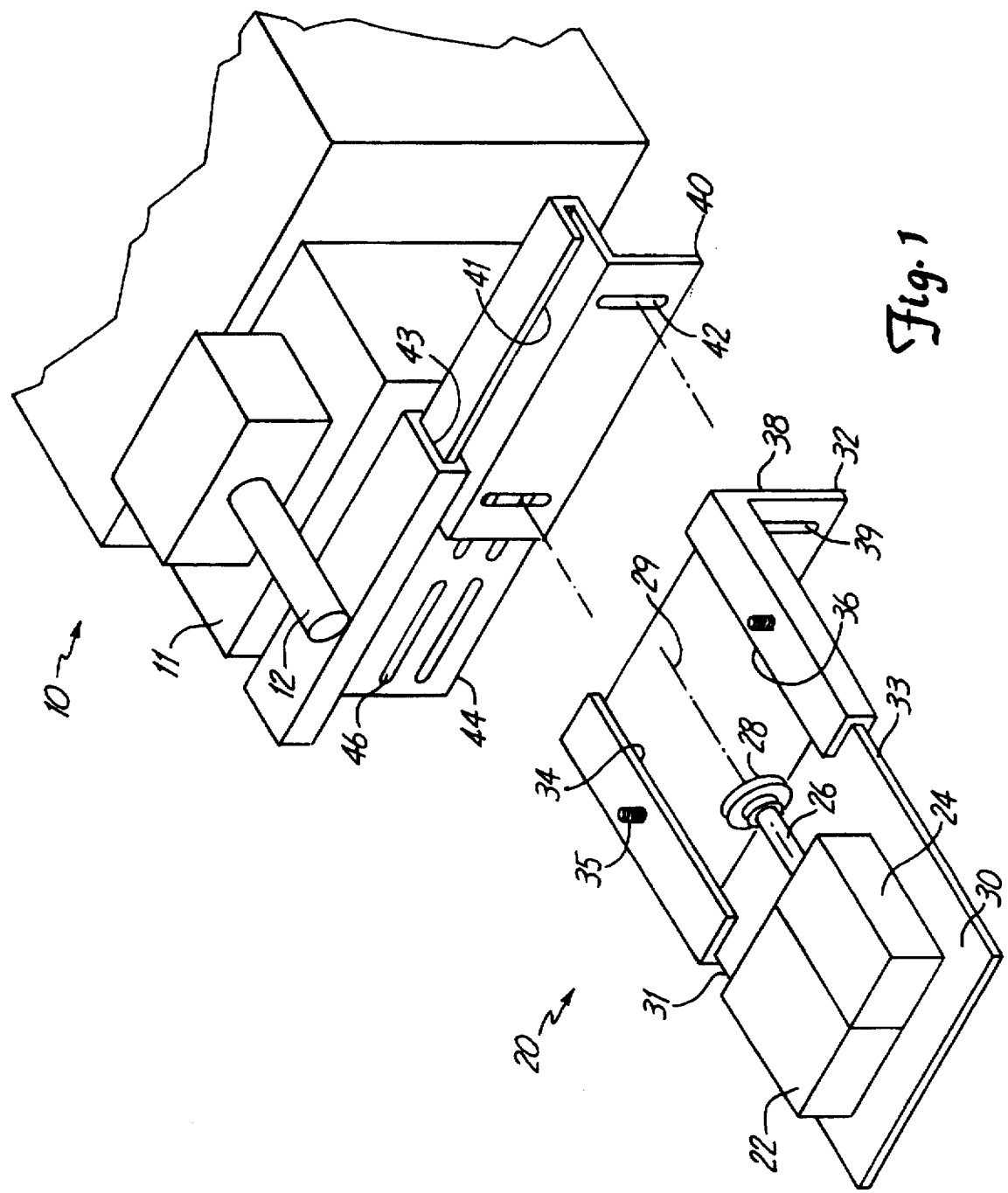
FIG. 1 is a perspective view of a portable apparatus for cycling valves according to the present invention.

FIG. 1 is a perspective view of valve cycling apparatus 20 of the present invention for coupling to motor-operated valve 10. Valve 10 includes motor operator 11 and rotary valve operator 12 for rotationally operating the valve.

Apparatus 20 includes rotary actuator 22 coupled to gear box 24. Gear box 24 includes output shaft 26 axially coupled to torque-sensing release clutch 28. Shaft 26 defines axis 29. Actuator 22 is preferably an electric motor, such as a 1725 r.p.m. motor (rated at 0.5 h.p.) from Leeson Electric Corp of Grafton, Wisconsin. It is understood, however, that actuator 22 may be any motive means (e.g., electric, pneumatic or hydraulic) capable of producing a rotational force in a forward or reverse direction. Gear box 24 preferably provides a 20:1 gear ratio, such as the model C70-HS from the Toledo Gearmotor Company of Sylvania, Ohio. The 20:1 ratio provides a drive speed of about 86 r.p.m. at shaft 26. Actuator 22 and gear box 24 may be varied as necessary for larger or smaller valves.

Actuator 22 and gear box 24 are mounted to base plate 30 which has left and right sides 31 and 33. Sides 31 and 33 are slidably engaged within left and right axial channels 34 and 36 of adapter bracket 32 to adjust the axial position of clutch 28 relative to valve operator 12. Axial channels 34 and 36 include fasteners 35 that impinge on sides 31 and 33 to clamp and lock base plate 30 to bracket 32. Adapter bracket 32 includes front face 38 which is perpendicular to axis 29 of shaft 26. Face 38 includes vertical slots 39 for fastening bracket 32 to adapter bracket 40 via vertical slots 42, using fasteners, such as bolts, that extend through slots 39 and 42. Vertical slots 39 and 42 permit vertical transaxial adjustment of the position of clutch 28 relative to valve operator 12. Bracket 40 also includes transaxial channel 41 which slidably engages transaxial channel 43 of valve bracket 44. The slidable engagement of channels 41 and 43 enable adjustment of the horizontal transaxial position of clutch 28 relative to valve operator 12. Bracket 44 includes horizontal slots 46 for fastening bracket 44 to a proximal face of motor operator 11. Motor operator 11 includes threaded fasteners, or the like (not shown), which extend through slots 46 to secure bracket 44 to the proximal face of operator 11. Base plate 30 and brackets 32, 40, and 44 are preferably formed of a durable rigid material, such as low-gauge steel or aluminum, capable of supporting the weight of actuator 20 and gear box 24. The combination of base plate 30 and adapter brackets 32, 40, and 44 comprise an adaptive mounting assembly which provides three-dimensional positioning of clutch 28 (and shaft 26) relative to valve operator 12 for coaxially coupling clutch 28 to valve operator 12.

Torque-sensing release clutch 28, also known as a mechanical fuse or torque-overload release coupling, mechanically couples output shaft 26 to valve operator 12. As long as torque in valve operator 12 is less than a preset torque limit, release clutch 28 transfers rotational forces of shaft 26 to operator 12 to operate valve 10. When the sensed torque reaches the preset torque limit, release clutch 28 decouples the rotational force of shaft 26 from operator 12, thereby preventing damage to operator 12, motor operator 11, and the associated valve. Decoupling the rotational forces provides overtorque protection by preventing both the rotational force and inertial forces of the rotary actuator from rotating operator 12 after reaching the preset torque limit. Thus, release clutch 28 assures safe and reliable valve cycling.

Preferably, release clutch 28 is bidirectional and adjustable to release at any preset torque, usually prescribed by the valve manufacturer or valve maintenance guidelines. Release clutch 28 also preferably includes a fail-safe feature that decouples the rotational force from operator 12 if release clutch 28 fails and a normally-retracted plunger that radially extends from the clutch when the clutch decouples. The preferred release clutch 28 is described in U.S. Pat. No. 4,548,305 to Anderson incorporated herein by reference. Such a release clutch is commercially available from Zero Max/Helland Motion Control Products of Minneapolis, Minn.

After mounting the apparatus to the valve and coupling clutch 28 to valve operator 12, actuator 22 is selectively operated to produce a rotational force that turns valve operator 12. During operation, release clutch 28 continuously senses, or monitors, torque in valve operator 12. As long as torque in operator 12 remains below the preset torque limit (and power is supplied to actuator 22), clutch 28 transfers the rotational force to the operator, thereby operating the valve. If torque in the operator reaches the preset torque limit because of binding or other valve malfunction, clutch 28 will decouple the rotational force from the operator to protect the valve. When the valve reaches its fully opened or closed position, torque in the valve operator will reach the preset limit and cause clutch 28 to decouple the rotational force from operator 12, again protecting the valve from damage. When reversed, the apparatus operates similarly to both cycle and protect the valve.

Figure 2:
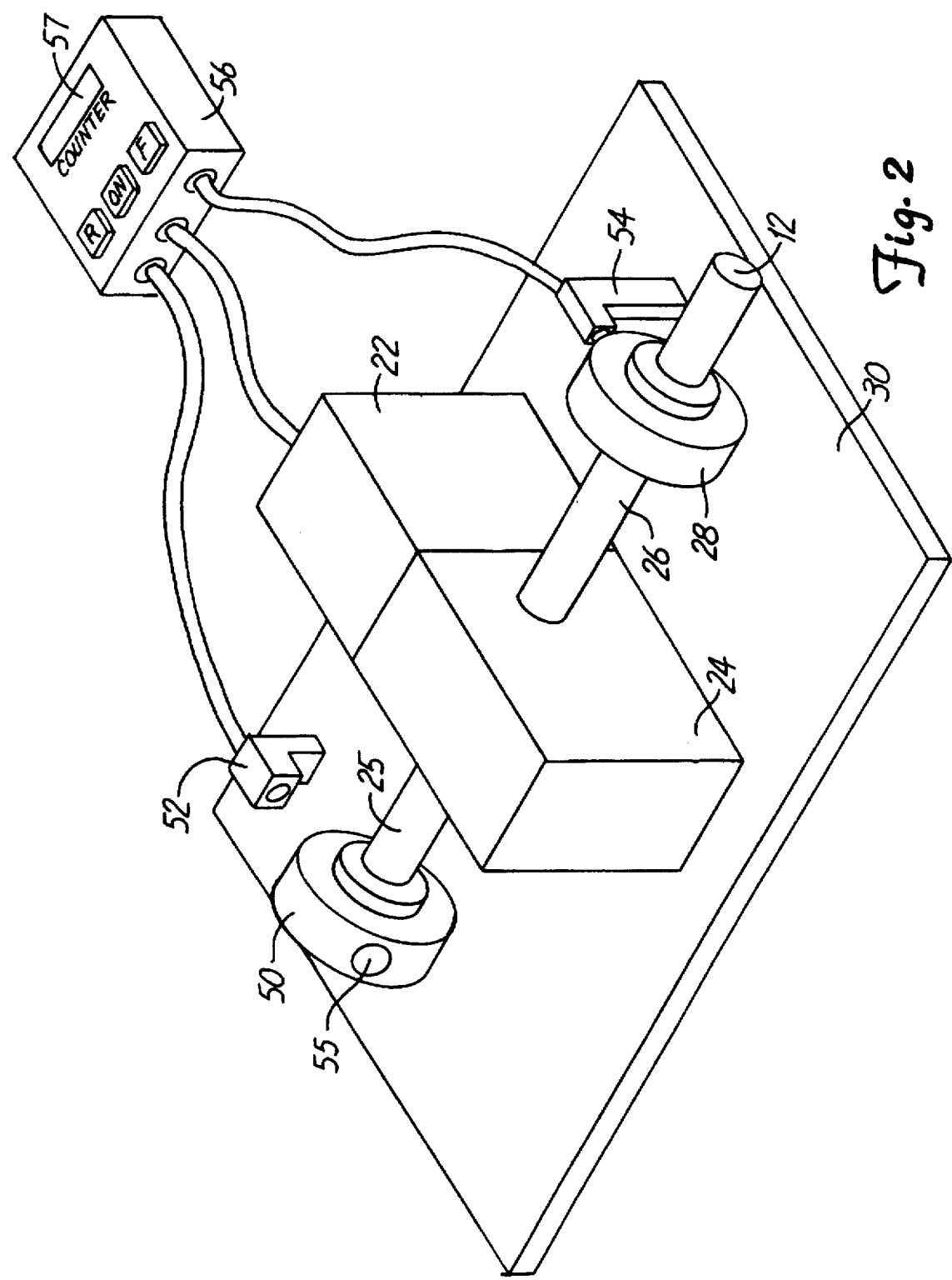
FIG. 2 is a perspective view of a modification of the portable apparatus for cycling valves.

FIG. 2 shows a preferred version of the present invention which includes rear extension 25 of shaft 26, counting cylinder 50 mounted to shaft 25, electric eye 52 mounted adjacent to cylinder 50, switch 54 mounted adjacent to clutch 28, and remote control unit 56 which includes counter 57. Counting cylinder 50 includes radial bore 55, which has a depth less than the diameter of cylinder 50. Cylinder 50 is fixed to rear extension 25 such that cylinder 50 rotates in unison with shaft 26 in a plane aligned with electric eye 52.

Electric eye 52 is mounted on a rear portion of base plate 30 and includes a light source and a light detector arranged to produce and detect reflections from cylinder 50. During operation of the apparatus, cylinder 50 rotates and electric eye 52 emits light that reflects from cylinder 50 to the light detector. When radial bore 55 passes through this light, it changes the reflected pattern, enabling the electric eye to sense passage of bore 55 once each revolution of shaft 26. Electric eye 52, in turn, communicates an electric signal to remote control unit 56, incrementing or decrementing counter 57 according to the direction of rotation of shaft 26. Given the number of operator turns required to cycle the valve, a worker operating the apparatus can use this count as a measure for position of the valve. This feature is particularly useful in setting and testing limit switches. Electric eye 52 is preferably a type such as model SM2A312CV from Banner Engineering Corporation of Minneapolis, Minn. As numerous other counting assemblies are readily adaptable to the present invention, the electric eye described herein is merely illustrative and not limiting. Likewise, in lieu of radial bore 55, cylinder 50 may be adapted to disrupt light reflections from the cylinder to the electric eye by applying a reflective or nonreflective material on the surface of the cylinder.

Switch 54, mounted on base plate 30 and operated by clutch 28, is electrically connected between remote control unit 56 and actuator 22. Switch 54 is normally-closed, but is opened to interrupt power to actuator 22 when engaged by the radially-extended plunger of release clutch 28. Thus, upon reaching the preset torque limit, release clutch 28 decouples the rotational forces of shaft 26 from operator 12 and extends its plunger to operate switch 54, thereby automatically disabling actuator 22.

Remote control unit 56 is electrically coupled to actuator 22, electric eye 52, and switch 54 and includes controls for selectively operating actuator 22 in forward and reverse directions. Unit 56 also includes resettable counter 57 for displaying the position of the valve as represented by the number of revolutions of shaft 26. As long as switch 54 is closed, unit 56 operates actuator 22 to rotate shaft 26 and cylinder 50, and electric eye 52 updates the count displayed by counter 57. When the preset torque limit is reached by operating the valve to its full open or closed position or by reason of valve binding, clutch 28 operates to open switch 54 to disable actuator 22. Unit 56 operates the apparatus from virtually any distance according to the length of connecting cables or reach of other known means for communicating control signals. Thus, unit 56 allows operation of the apparatus at a distance to reduce exposure to radiation, high heat, or other valve- environment hazards. In all other respects, the preferred version of the present invention operates similarly to the device described above.

Figure 3:
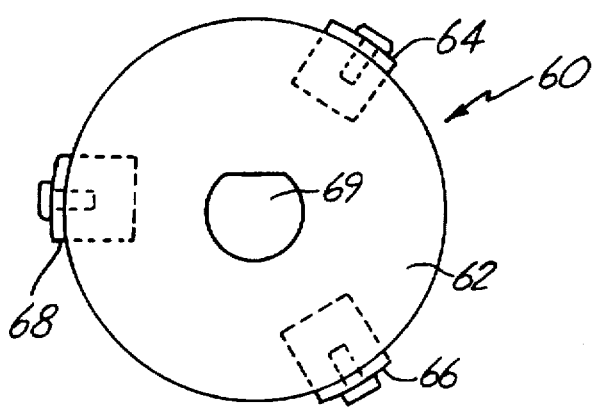
FIGS. 3 and 4 are front and side views of a handwheel adapter plate for fastening to a handwheel shown in FIG. 5.
Figure 4:
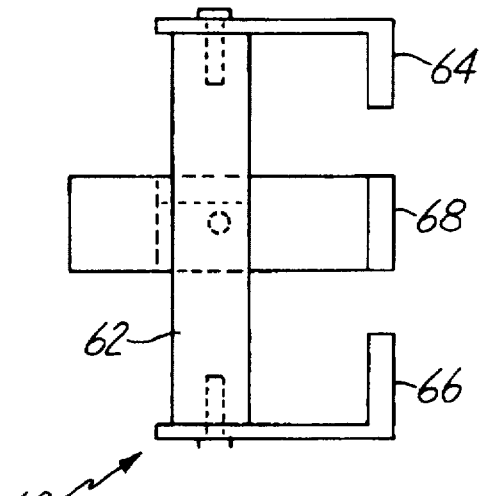
Figure 5:
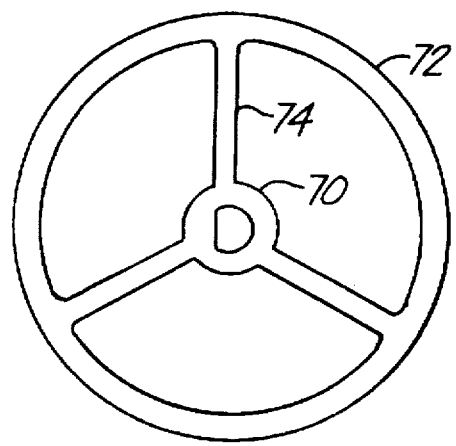

FIGS. 3 and 4 show respective front and side views of handwheel adapter assembly 60 for coupling release clutch 28 directly to a valve handwheel, such as that shown in FIG. 5. Such a handwheel usually includes hub 70, outer concentric ring 72, and spokes 74 radially extending from the hub to the outer concentric ring. Adapter assembly 60 includes circular adapter plate 62 and L-shaped brackets 64, 66, and 68 fastened to the peripheral face of plate 62. Each upper-L portion extends perpendicularly away from plate 62, and each lower-L portion is parallel to plate 62. When coupled to the handwheel, plate 62 confronts the outer concentric ring, and brackets 64, 66, and 68 engage the outer ring to secure plate 62 to the handwheel. Plate 62 includes center hole 69 for coupling to release clutch 28 via a shaft (not shown). When properly engaged with the handwheel and coupled to release clutch 28, handwheel adapter plate 60 enables apparatus 20 to cycle a valve using the handwheel.

Those skilled in the art will understand that the present invention overcomes many limitations of prior portable valve actuators. In particular, unlike previous portable valve actuators, the present invention provides a fail-safe torque-sensing release clutch which fully safeguards valves from overtorqing. More precisely, the present invention decouples rotational forces from the valve operator upon sensing a torque in the valve operator at least as great as a preset torque limit, or threshold. Hence, the present invention decouples these forces when torque in the valve operator meets or exceeds the torque limit. In addition, the present invention automatically disables the rotary actuator upon reaching the torque limit, thereby preventing injury to workers near the valve. The present invention also includes a valve position indicator assembly which accurately measures and indicates valve position, and a remote control unit that enables cycling valves from virtually any distance. The remote control unit reduces exposure of workers to hazards, such as heat and radiation, in the valve environment. In short, the present invention provides an efficient, adaptable, fail-safe tool for cycling valves.

Although the present invention has been described with reference to preferred embodiments, workers skilled in the art will recognize that changes may be made in form and detail without departing from the spirit and scope of the invention.

What is claimed is:

1. Apparatus for operating a valve between open and closed positions, the valve having a valve operator for rotationally operating the valve between the open and closed positions, the valve operator having an axis, the apparatus comprising:

a rotary actuator operable to develop a rotational force, the rotary actuator having an output shaft defining an axis; and a torque-sensing release clutch for transferring the rotational force to the valve operator and for decoupling the rotational force from the valve operator upon sensing torque at least as great as a preset torque limit, an adaptive mounting assembly for mounting the apparatus to the valve and coaxially aligning the output shaft and the valve operator, wherein the adaptive mounting assembly includes:

a base plate supporting the rotary actuator and the output shaft, the base plate having first and second opposing sides;

a first adapter bracket having first and second axial channels slidably engaging the first and second sides of the base plate and a transaxial face having first mounting slots, the first adapter bracket cooperating with the base plate to adjust an axial position of the output shaft relative to the valve operator;

a second adapter bracket having a first transaxial channel and second mounting slots corresponding to the first mounting slots, the second adapter bracket cooperatively fastened via the second mounting slots to the first adapter bracket to adjust a first transaxial position of the output shaft relative to the valve operator; and a valve bracket having a second transaxial channel slidably engaging the first transaxial channel of the second adapter bracket and having third mounting slots for mounting to the valve, the second adapter bracket cooperating with the second adapter bracket to adjust a second transaxial position of the output shaft relative to the valve operator.

2. The apparatus of claim 1 wherein the torque-sensing release clutch is bidirectional and adjustable to a selected torque within a range of torques.

3. The apparatus of claim 1 wherein the torque-sensing release clutch is a fail-safe torque-sensing release clutch that decouples the rotational force from the valve operator upon failure of the torque-sensing release clutch.

4. The apparatus of claim 1 including lock means for locking the base plate to the first adapter bracket.

5. The apparatus of claim 1 further including a valve position indicator assembly operatively coupled to the output shaft.

6. The apparatus of claim 5 wherein the valve position indicator assembly includes counting means operatively coupled to the valve operator to count revolutions of the valve operator and count indication means operatively coupled to the counting means to indicate the count.

7. The apparatus of claim 1 further including a switch operated by the torque-sensing release clutch and responsive to the clutch sensing the preset torque limit to disable the rotary actuator.

8. The apparatus of claim 1 further including a controller coupled to the rotary actuator to selectively operate the apparatus in forward and reverse directions.

9. The apparatus of claim 1 including:

a gear box coupled between the output shaft of the rotary actuator and the torque-sensing release clutch;

an adaptive mounting assembly supporting the rotary actuator, the torque-sensing release clutch, and the gear box, the adaptive mounting assembly for mounting the apparatus to the valve and coaxially aligning the torque-sensing release clutch to the valve operator;

a valve position indicator operatively coupled to the output shaft of the rotary actuator to indicate valve position;

a switch responsive to the torque-sensing release clutch decoupling the rotational force from the valve operator to disable the rotary actuator; and a controller operatively coupled to the rotary actuator to selectively and remotely operate the rotary actuator.

10. The apparatus of claim 9 including means connecting the controller to the rotary actuator and the switch to permit remote operation of the apparatus.

11. The apparatus of claim 1 including counting means operatively coupled to the valve operator to count revolutions of the valve operator, a switch operatively coupled to the torque-sensing release clutch and responsive to the clutch sensing the preset torque limit to disable the rotary actuator, and a controller having:

count indication means operatively coupled to the counting means to communicate the count; and means coupled to the rotary actuator to selectively operate the rotary actuator in forward and reverse directions.

12. The apparatus of claim 11 including means connecting the controller to the rotary actuator and the switch to permit remote operation of the apparatus.

13. Apparatus for operating a valve between open and closed positions, the valve having a valve operator for rotationally operating the valve between the open and closed positions and a handwheel coupled to the valve operator, the apparatus comprising:

a rotary actuator operable to develop a rotational force;

a torque-sensing release clutch for transferring the rotational force to the valve operator and for decoupling the rotational force from the valve operator upon sensing torque at least great as a preset torque limit; and a handwheel adapter assembly for coupling between the torque-sensing release clutch and the handwheel, wherein the handwheel adapter assembly includes:

an adapter plate for coupling to the torque-sensing release clutch; and a plurality of slidable two-armed brackets adjustably fastened to the adapter plate so that a first arm of each bracket is substantially perpendicular to the adapter plate and a second arm of each bracket is adjustably spaced from the adapter plate to secure the adapter plate to the handwheel.

14. Maintenance apparatus for cycling a motor-operated valve between open and closed positions, the motor-operated valve having a motorized rotary actuator for rotationally operating the valve between the open and closed positions, the maintenance apparatus comprising:

a second motorized rotary actuator operable to develop a rotational force;

a torque-sensing release clutch for transferring the rotational force of the second motorized rotary actuator to the motor-operated valve and for decoupling the rotational force from the motor-operated valve upon sensing torque at least as great as a preset torque limit, thereby protecting the motor-operated valve from over-torquing during cycling.

15. The maintenance apparatus of claim 14 wherein the motor-operated valve defines an axis of rotation, and the second motorized rotary actuator has an output shaft, with the maintenance apparatus further including:

an adaptive mounting assembly, including a bracket, for adaptively mounting the maintenance apparatus to the motor-operated valve such that the output shaft of the second motorized rotary actuator aligns with the axis of rotation.

16. The maintenance apparatus of claim 15 wherein the adaptive mounting assembly includes:

a base plate supporting the second motorized rotary actuator and the output shaft, the base plate having first and second opposing sides;

a first adapter bracket having first and second axial channels slidably engaging the first and second sides of the base plate and a transaxial face having first mounting slots, the first adapter bracket cooperating with the base plate to adjust an axial position of the output shaft relative to the axis of rotation;

a second adapter bracket having a first transaxial channel and second mounting slots corresponding to the first mounting slots, the second adapter bracket cooperatively fastened via the second mounting slots to the first adapter bracket to adjust a first transaxial position of the output shaft relative to the axis of rotation; and a valve bracket having a second transaxial channel slidably engaging the first transaxial channel of the second adapter bracket and having third mounting slots for mounting to the valve, the second adapter bracket cooperating with the second adapter bracket to adjust a second transaxial position of the output shaft relative to the axis of rotation.

17. The maintenance apparatus of claim 14 wherein the motor-operated valve includes a handwheel for operating the motor-operated valve, the maintenance apparatus further including:

a handwheel adapter assembly, including a bracket, for coupling the second motorized rotary actuator to the handwheel.

18. The maintenance apparatus of claim 17 wherein the handwheel adapter assembly includes:

an adapter plate for coupling to the second motorized rotary actuator; and a plurality of slidable two-armed brackets adjustably fastened to the adapter plate so that a first arm of each bracket is substantially perpendicular to the adapter plate and a second arm of each bracket is adjustably spaced from the adapter plate to secure the adapter plate to the handwheel.

\* \* \* \* \*